US011286793B2

(12) United States Patent
Spangler et al.

(10) Patent No.: US 11,286,793 B2
(45) Date of Patent: Mar. 29, 2022

(54) AIRFOIL WITH RIBS HAVING CONNECTOR ARMS AND APERTURES DEFINING A COOLING CIRCUIT

(71) Applicant: United Technologies Corporation, Farmington, CT (US)

(72) Inventors: Brandon W. Spangler, Vernon, CT (US); David R. Pack, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 445 days.

(21) Appl. No.: 16/545,451

(22) Filed: Aug. 20, 2019

(65) Prior Publication Data

US 2021/0054746 A1 Feb. 25, 2021

(51) Int. Cl.
*F01D 5/18* (2006.01)
*F01D 5/14* (2006.01)

(52) U.S. Cl.
CPC .............. *F01D 5/187* (2013.01); *F01D 5/141* (2013.01); *F05D 2220/323* (2013.01); *F05D 2240/301* (2013.01); *F05D 2260/201* (2013.01); *F05D 2260/22141* (2013.01); *F05D 2260/232* (2013.01)

(58) Field of Classification Search
CPC .......... F01D 5/187; F01D 5/188; F01D 5/189; F05D 2260/201
See application file for complete search history.

(56) References Cited

U.S. PATENT DOCUMENTS

| 7,497,655 B1* | 3/2009 | Liang ..................... F01D 5/189 415/1 |
| 7,556,476 B1 | 7/2009 | Liang |
| 7,871,246 B2 | 1/2011 | Liang |
| 9,115,590 B2 | 8/2015 | Spangler et al. |

(Continued)

FOREIGN PATENT DOCUMENTS

| WO | 2015077017 | 5/2015 |
| WO | 2017039571 | 3/2017 |

(Continued)

OTHER PUBLICATIONS

European Search Report for European Patent Application No. 20191759.8 dated Oct. 29, 2020.

*Primary Examiner* — Eldon T Brockman
(74) *Attorney, Agent, or Firm* — Carlson, Gaskey & Olds, P.C.

(57) ABSTRACT

An airfoil includes an airfoil wall that defines a leading end, a trailing end, and first and second sides joining the leading end and the trailing end. First and second ribs each connect the first and second sides of the airfoil wall. Each of the first and second ribs define a tube portion that circumscribes a rib passage and includes cooling apertures, and first and second connector arms that solely join the tube portion to, respectively, the first and second sides of the airfoil wall. The airfoil wall and the first and second ribs bound a cooling channel there between. The cooling apertures of the first and second ribs open at the cooling channel such that there is a cooling circuit in which the rib passages of the first and second ribs are fluidly connected through the cooling apertures and the cooling channel.

21 Claims, 6 Drawing Sheets

(56) References Cited

U.S. PATENT DOCUMENTS

| | | | |
|---|---|---|---|
| 9,551,228 B2 | 1/2017 | Propheter-Hinckley et al. | |
| 10,024,171 B2 | 7/2018 | Itzel | |
| 10,247,034 B2 | 4/2019 | Papple et al. | |
| 10,267,162 B2 * | 4/2019 | Leary | F01D 25/12 |
| 10,428,686 B2 * | 10/2019 | Marsh | F01D 25/12 |
| 10,494,931 B2 * | 12/2019 | Landrum | F02C 7/18 |
| 10,533,427 B2 * | 1/2020 | Marsh | F01D 5/189 |
| 10,711,619 B2 * | 7/2020 | Marsh | F01D 5/186 |
| 10,830,061 B2 * | 11/2020 | Marsh | F01D 5/186 |
| 2017/0101893 A1 * | 4/2017 | Marsh | F01D 5/18 |
| 2018/0051577 A1 * | 2/2018 | Leary | F01D 5/187 |
| 2019/0024515 A1 * | 1/2019 | Marsh | F01D 5/189 |
| 2019/0093487 A1 * | 3/2019 | Marsh | F01D 5/189 |
| 2019/0101011 A1 * | 4/2019 | Marsh | F01D 5/187 |
| 2020/0277860 A1 * | 9/2020 | Gross | F01D 5/186 |

FOREIGN PATENT DOCUMENTS

| | | |
|---|---|---|
| WO | 2017039572 | 3/2017 |
| WO | 2017171763 | 10/2017 |

* cited by examiner

AIRFOIL WITH RIBS HAVING CONNECTOR ARMS AND APERTURES DEFINING A COOLING CIRCUIT

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil wall that defines a leading end, a trailing end, and first and second sides that join the leading end and the trailing end. First and second ribs each connect the first and second sides of the airfoil wall. Each of the first and second ribs define a tube portion that circumscribes a rib passage and includes cooling apertures. First and second connector arms solely join the tube portion to, respectively, the first and second sides of the airfoil wall. The airfoil wall and the first and second ribs bound a cooling channel there between. The cooling apertures of the first and second ribs open at the cooling channel such that there is a cooling circuit in which the rib passages of the first and second ribs are fluidly connected through the cooling apertures and the cooling channel.

In a further embodiment of any of the foregoing embodiments, the tube portion includes forward and aft walls and first and second side walls join the forward and aft walls. The first connector arm projects from the first side wall and the second connector arm projects from the second side wall, and one or more of the cooling apertures are located in the first and second side walls.

In a further embodiment of any of the foregoing embodiments, one or more of the cooling apertures are located in the forward and aft walls.

In a further embodiment of any of the foregoing embodiments, the airfoil wall includes a plurality of cooling holes, at least a portion of the cooling holes opening at the cooling channel.

In a further embodiment of any of the foregoing embodiments, the trailing end of the airfoil wall includes cooling holes that are in the cooling circuit downstream of the first and second ribs.

In a further embodiment of any of the foregoing embodiments, the tube portion has a chevron shape.

In a further embodiment of any of the foregoing embodiments, the cooling channel has two side lobe portions which extend along, respectively, the first and second sides of the airfoil wall, and a middle portion that connects the two side lobe portions.

In a further embodiment of any of the foregoing embodiments, the middle portion includes two retrograde segments that extend, respectively, from the two side lobe portions.

An airfoil according to an example of the present disclosure includes an airfoil wall that defines a leading end, a trailing end, and first and second sides that join the leading end and the trailing end. A feed rib and a dependent rib each connect the first and second sides of the airfoil wall. The feed rib and the dependent rib each define a tube portion that circumscribes a rib passage and includes cooling apertures. First and second connector arms solely join the tube portion to, respectively, the first and second sides of the airfoil wall. The airfoil wall, the feed rib, and the dependent rib bound a cooling channel there between, wherein the rib passage of the feed rib is configured to receive source cooling air and feed the source cooling air via the cooling apertures and the cooling channel to the rib passage of the dependent rib.

In a further embodiment of any of the foregoing embodiments, the rib passage of the dependent rib is fully dependent on the feed rib to receive cooling air.

In a further embodiment of any of the foregoing embodiments, the rib passage of the dependent rib is partially dependent on the feed rib to receive cooling air.

In a further embodiment of any of the foregoing embodiments, the feed rib is forward of the dependent rib.

In a further embodiment of any of the foregoing embodiments, the feed rib is aft of the dependent rib.

In a further embodiment of any of the foregoing embodiments, the cooling channel has two side lobe portions which extend along, respectively, the first and second sides of the airfoil wall, a middle portion that connects the two side lobe portions, and the middle portion includes two retrograde segments that extend, respectively, from the two side lobe portions.

In a further embodiment of any of the foregoing embodiments, the cooling apertures include impingement cooling apertures in the feed rib and the dependent rib which are configured to provide impingement cooling on the airfoil wall and inflow cooling apertures in the dependent rib which are configured to reduce pressure loss of the cooling air entering the rib passage of the dependent rib.

An airfoil according to an example of the present disclosure includes an airfoil wall that defines a leading end, a trailing end, and first and second sides joining the leading end and the trailing end. A feed rib, a primary dependent rib, and a secondary dependent rib each connect the first and second sides of the airfoil wall. The feed rib, the primary dependent rib, and the secondary dependent rib each define a tube portion that circumscribes a rib passage and includes cooling apertures. First and second connector arms solely join the tube portion to, respectively, the first and second sides of the airfoil wall. The airfoil wall, the feed rib and the primary dependent rib bound a first cooling channel there between and the airfoil wall. The primary dependent rib, and the secondary dependent rib bound a second cooling channel there between. The rib passage of the feed rib is configured to receive source cooling air and feed the source cooling air via the cooling apertures and the first cooling channel to the rib passage of the primary dependent rib and the primary dependent rib is configured to feed the cooling air via the cooling apertures and the second cooling channel to the rib passage of the secondary dependent rib.

In a further embodiment of any of the foregoing embodiments, the rib passage of the primary dependent rib is fully dependent on the feed rib to receive cooling air, and the rib passage of the secondary dependent rib is fully dependent on the primary dependent rib to receive cooling air.

In a further embodiment of any of the foregoing embodiments, the feed rib is forward of the primary dependent rib and the secondary dependent rib.

In a further embodiment of any of the foregoing embodiments, the feed rib is aft of the primary dependent rib and the secondary dependent rib.

In a further embodiment of any of the foregoing embodiments, the first cooling channel and the second cooling channel each have two side lobe portions which extend along, respectively, the first and second sides of the airfoil wall, a middle portion that connects the two side lobe portions, and the middle portion includes two retrograde segments that extend, respectively, from the two side lobe portions.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
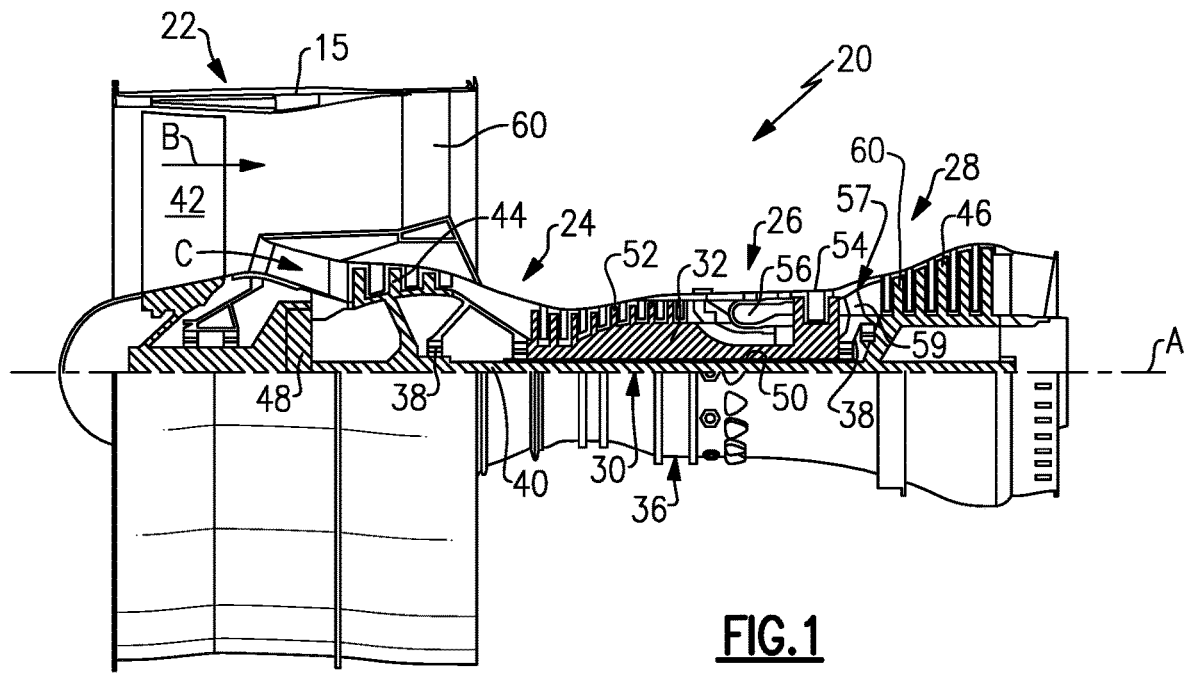
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
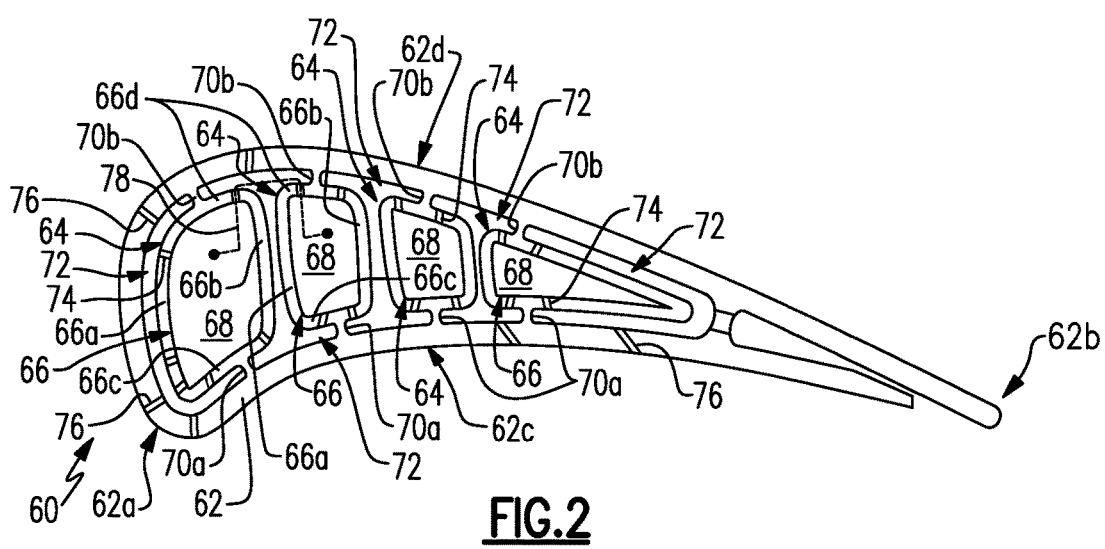
FIG. 2 illustrates a sectioned view of an example airfoil of the engine.
Figure 3:
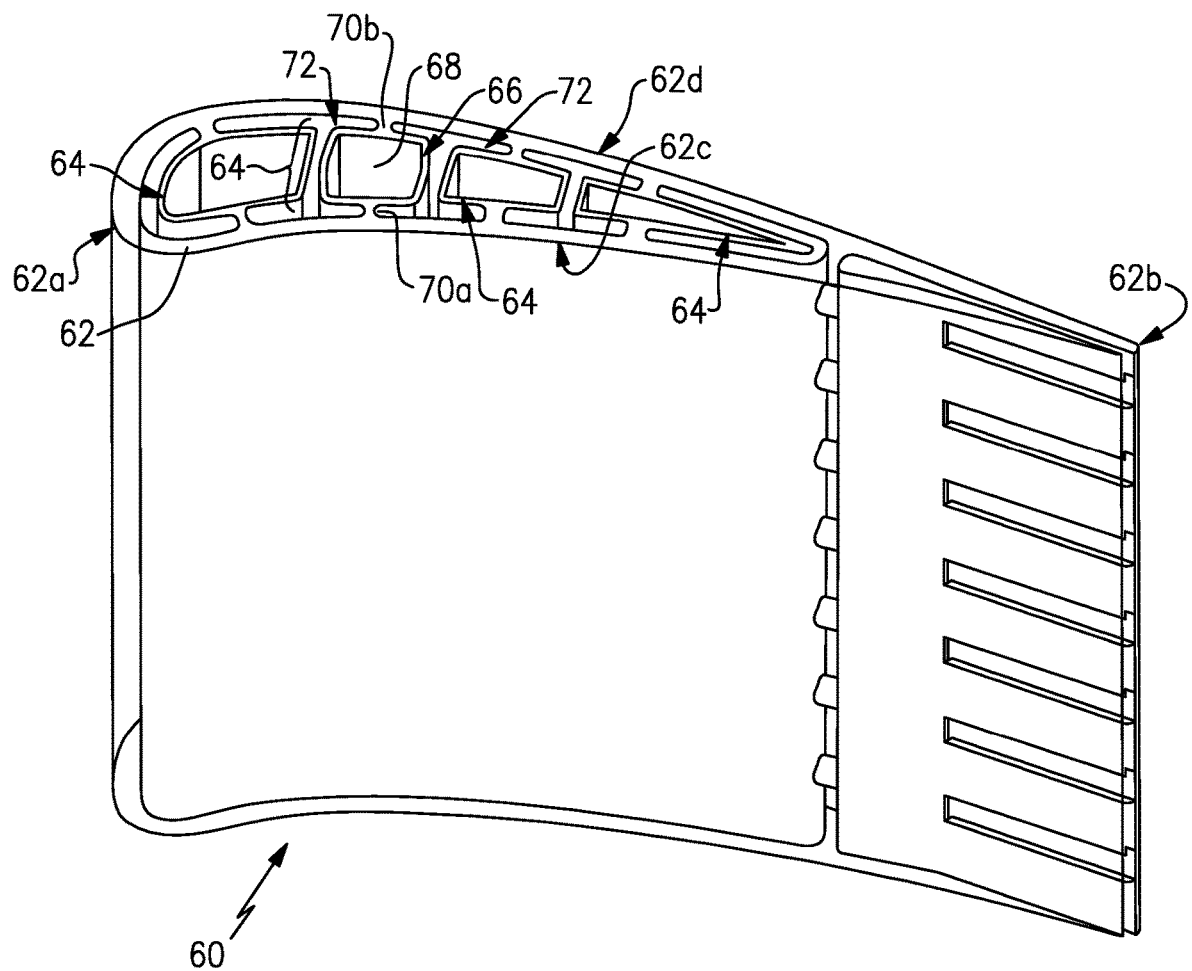
FIG. 3 illustrates a perspective view of the airfoil of FIG. 2.

FIG. 2 illustrates a representative sectioned view of an example of an airfoil 60 used in the turbine engine 20 (see also FIG. 1), and FIG. 3 illustrates a perspective view of the airfoil 60. As shown, the airfoil 60 is a turbine blade; however, it is to be understood that, although the examples herein may be described and shown with reference to turbine blades or vanes, this disclosure is also applicable to cooled blades or vanes in other locations than shown.

The airfoil 60 includes an (outer) airfoil wall 62 that delimits the aerodynamic profile of the airfoil 60. In this regard, the wall 62 defines a leading end 62a, a trailing end 62b, and first and second sides 62c/62d that join the leading end 62a and the trailing end 62b. In this example, the first side 62c is a pressure side and the second side 62d is a suction side. The airfoil wall 62 generally extends in an axial direction relative to the central engine axis A. For a blade, the airfoil wall 62 will typically span in a longitudinal direction from an inner platform to a free tip end. In a vane, the airfoil wall 62 will typically span in a longitudinal direction from an inner platform to an outer platform.

The airfoil 60 further includes a plurality of ribs 64. Each rib 64 connects the first and second sides 62c/62d of the airfoil wall 62. Each rib 64 is generally longitudinally elongated between an inner diameter and outer diameter such that it spans the full or substantially full longitudinal distance of the airfoil wall 62. The term substantially full refers to at least 70% of the longitudinal distance between the inner diameter and outer diameter. Each rib 64 defines a tube portion 66 that circumscribes a rib passage 68, and first and second connector arms 70a/70b that solely join the tube portion 66 to, respectively, the first and second sides 62c/62d of the airfoil wall 62. As used herein, the phrase "solely join" or variations thereof refers to the arm 70a being the exclusive structural attachment of the tube portion 66 to the first side 62c and the arm 70b being the exclusive structural attachment of the tube portion 66 to the second side 62d. Such an attachment configuration permits each rib 64 to reinforce the sides 62c/62d to facilitate reduction in bulging from internal pressure, while still permitting the ribs 64 to move and thermally expand and contract at a different rate than the sides 62c/62d during thermal cycling and without interference from adjacent ribs 64.

In the illustrated example, each of the tube portions 66 is generally rectangular, however, other shapes, such as ellipses or triangles, may also be used. A further example shape will also be described below. Each tube portion 66 includes forward and aft walls 66a/66b and first and second side walls 66c/66d that join the forward and aft walls 66a/66b. The first connector arm 70a projects from the first side wall 66c and the second connector arm 70b projects from the second side wall 66d.

The ribs 64 partition the interior cavity of the airfoil 60 such that the airfoil wall 62 and adjacent ribs 64 bound cooling channels 72 there between. The forward-most and the aft-most cooling channels 72 are bound by only one rib 64 and the airfoil wall 62. Cooling air, such as bleed air from the compressor section 24 of the engine 20, can be provided thorough the rib passages 68 and the cooling channels 72. For instance, the cooling air can be fed from a radially inner or radially outer location into one or more of the rib passages 68, which feed the cooling air to the cooling channels 72. The rib passages 68 are thermally isolated from the airfoil wall 62 except for the connector arms 70a/70b. Thus, cooling air delivered through the rib passages gains minimal heat from the airfoil wall 62, thereby permitting the ribs 64 to feed relatively cool air to the cooling channels 72.

The tube portions 66 include cooling apertures 74 (which for viewability are not all numbered). Each cooling aperture 74 opens on one end at a rib passage 68 and on its opposite end at a cooling channel 72, thereby fluidly connecting the rib passage 68 and cooling channel 72. The airfoil wall 62 also includes a plurality of cooling holes 76 (not all numbered). Each cooling hole 76 opens on one end at a cooling channel 72 and on its opposite end at the exterior of the airfoil wall 62, thereby fluidly connecting the cooling channel 72 and the exterior of the airfoil wall 62. The ribs 64 provide a cooling circuit, a portion of which is shown at 78, in which the rib passages 68 of the ribs 64 are fluidly connected through the cooling apertures 74 and the cooling channel or channels 72. The cooling air generally flows axially, from the rib passage 68 of one rib 64 to an adjacent cooling channel 72 and then, depending on the configuration, into the rib passage 68 of the next rib 64.

The cooling channels 72 are generally "H" shaped, with the side lobe portions of the "H" extending along, respectively, the first and second sides 62c/62d of the airfoil wall 62 and the middle portion of the "H" extending between the ribs 64. The side lobe portions of the "H" have a low dimensional aspect ratio, meaning the axial distance of the side lobe portions of the "H" between adjacent rib connector arms is larger than the circumferential distance between the sides 62c/62d of the airfoil wall 62 and the rib sidewalls 66c/66d. Such a shape facilitates providing much of the cooling air flow along the sides 62c/62d of the airfoil wall 62 to enhance cooling. The middle portion of the "H" also connects the side lobe portions of the "H" such that cooling flow can migrate from the second side 62d to the first side 62c. For instance, the flow can be discharged exclusively or primarily through cooling holes 76 on the higher pressure first side 62c, which facilitates reducing gaspath mixing losses that may be incurred if the cooling air was instead discharged to the lower gaspath pressure at the second side 62d. Additionally, if apertures 74 are only included on the second rib sidewall 66d, the cooling flow may be concentrated to impinge on the second airfoil sidewall 62c before flowing through the middle portion of the "H" and out through cooling holes 76 on the first side 62c. Moreover, since the tube portions 66 are only connected to the sides 62c/62d via the connector arms 70a/70b, the rib passages 68 are substantially thermally isolated from the sides 62c/62d.

The initial entry of the cooling air into one or more of the ribs 64 and the locations of the cooling apertures 74 establish the path of the cooling circuit 78. In this regard, as will be described below, the ribs 64 and apertures 74 permit numerous different axial cooling circuit schemes. In such schemes, one or more of the ribs 64 may serve as a feed rib. A feed rib is any rib 64 that receives an initial source of cooling air into its rib passage 68 for distribution to one or more of the cooling channels 72 and one or more rib passages 68 of other ribs 64. For example, the initial source of cooling air is bleed air from the compressor section 24 or cooling air that has at least not travelled through any other ribs 64. One or more feed ribs may supply the cooling air to the rib passages 68 of one or more other ribs 64 via the cooling channels 72 and apertures 74. A rib passage 68 of a rib 64 that receives cooling air from a feed rib is a primary dependent rib. The cooling air in a primary dependent rib may then be supplied via the cooling channels 72 and apertures 74 to the rib passages 68 of one or more other ribs 64. A rib passage 68 of a rib 64 that receives cooling air from a primary dependent rib is a secondary dependent rib. The ribs 64 may be further classified as either fully or partially dependent. A fully dependent rib is any rib 64 (primary or secondary) that receives cooling air from only a single feed rib. A partially dependent rib is any rib 64 that receives cooling air from more than one feed rib.

The following examples demonstrate different cooling circuit schemes that are illustrated by flow arrows. For viewability, where a flow arrow extends through a tube portion 66 there is assumed to be an aperture 74 (although not numbered), and where a flow arrow extends through the airfoil wall 62 there is assumed to be a cooling hole 76 (although not numbered). Additionally, the ribs 64 may be referred to by their order, from fore (near the leading end 62a) to aft (near the trailing end 62b), as a first or forwardmost rib, a last or aft-most rib, a second or forward intermediate rib, and a third or aft intermediate rib. Although "first," "second," etc. refers to order in the contexts of describing the flow in some examples, such numerical ordering is arbitrary and any two of the ribs 64 may also generically be considered to be "first" and "second" ribs 64. Furthermore, although the illustrated examples are based on four ribs 64, it is to be understood that the airfoils and schemes shown are not limited to four ribs 64 and may also be applied to airfoils that have fewer or additional ribs 64.

Figure 4:
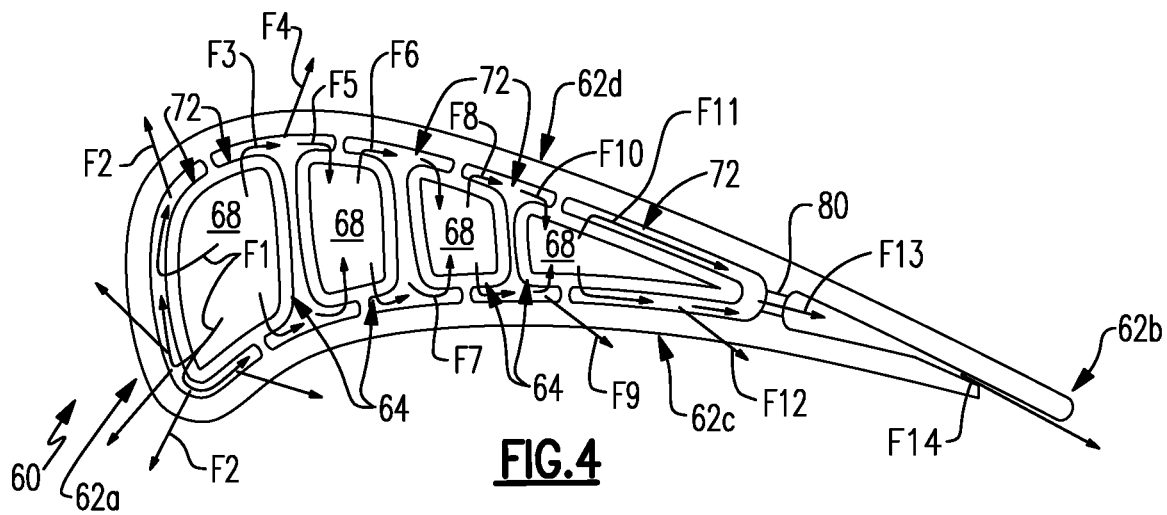
FIG. 4 illustrates an airfoil with a full axial flow cooling circuit.

Referring to FIG. 4, the airfoil 60 is configured with a full axial flow cooling circuit in which the flow of the cooling air is indicated by flow arrows. In this example, the first rib 64 is a feed rib. The feed rib provides cooling air F1 to the forward cooling channel 72 adjacent the leading end 62a. The cooling channel 72 discharges cooling air F2 at the leading end 62a and forward portions of the sides 62c/62d. The feed rib also provides cooling air F3 to the next adjacent cooling channel 72. The cooling channel 72 discharges cooling air F4 through the second side 62d of the airfoil wall 62 and feeds cooling air F5 into the rib passage 68 of the second rib 64. The second rib 64 is thus a primary dependent rib that receives cooling air from the first rib 64. The second rib 64 provides cooling air F6 into the adjacent cooling channel 72, which feeds cooling air F7 into the rib passage 68 of the third rib 64. The third rib 64 is thus a secondary dependent rib. The third rib 64 provides cooling air F8 into the adjacent cooling channel 72, which discharges cooling air F9 through the side 62c and feeds cooling air F10 into the rib passage 68 of the last rib 64. The last rib 64 is thus also a secondary dependent rib (or tertiary dependent rib). The last rib 64 feeds cooling air F11 into the adjacent cooling channel 72. The cooling channel 72 discharges cooling air F12 through the side 62c and feeds cooling air F13 through holes or slots 80, which discharges cooling air F14 from the trailing end 62b. Although suction side discharge air F4 and pressure side discharge air F9, F12 are shown in a given cooling channel 72, the discharge may occur in any or all of the cooling channels 72.

As will be further appreciated from the flow arrows herein, the tube portions 66 of the ribs 64 have apertures 74 on both side walls 66c/66d that may serve to feed the cooling air as an impingement flow onto both sides 62c/62d of the airfoil wall. In this regard, the apertures 74 may be oriented at approximately 90° to the respective side 62c/62d. In alternate examples, to reduce pressure loss, the apertures 74 may be sloped at less than 90° to the respective side 62c/62d and/or made relatively larger. The slope and/or size may reduce cooling effectiveness, but trip strips, pin fins, dimples, bumps, or other heat transfer augmentation features may be used to enhance heat transfer. Since the tube portions 66 are thermally isolated from the external airfoil wall 62, they do not need the heat transfer benefit provided by impinging jets. Therefore, the cooling apertures 74 that transfer cooling air from a cooling channel 72 into a rib passage 68 may be configured, as described above, to minimize pressure loss. For example, apertures 74 for inflow of cooling air into a rib passage 68, such as that of a dependent rib, may be relatively larger in area than other apertures 74 that are used for impingement outflow of cooling air from a rib passage 68 into a channel 72 onto the sides 62c/62d of the airfoil wall 62. For instance, the collective area of the inflow apertures 74 of a dependent rib is greater than the collective area of the impingement outflow apertures 74 of the feed rib and/or dependent rib. The collectively larger area of the inflow apertures 74 thus avoids a "bottleneck" in flow.

Figure 5:
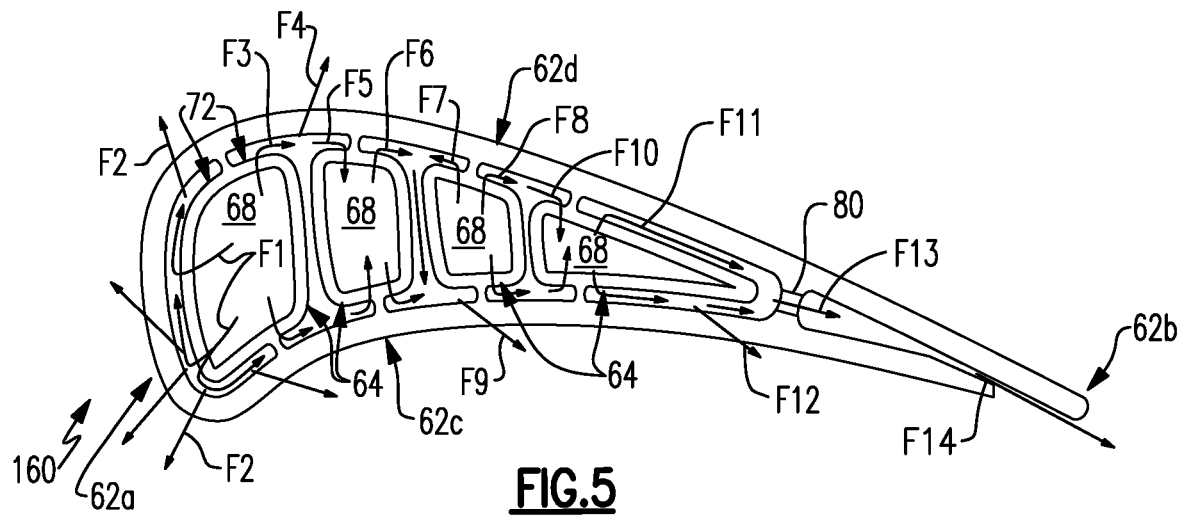
FIG. 5 illustrates an airfoil with a dual axial flow cooling circuit.

Referring to FIG. 5, the airfoil 160 is configured with a dual axial flow cooling circuit in which the flow of the cooling air is indicated by flow arrows. In this example, the first rib 64 is a feed rib. The feed rib provides cooling air F1 to the forward cooling channel 72 adjacent the leading end 62a. The cooling channel 72 discharges cooling air F2 at the leading end 62a and forward portions of the sides 62c/62d. The feed rib also provides cooling air F3 to the next adjacent cooling channel 72. The cooling channel 72 discharges cooling flow F4 through the side 62d of the airfoil wall 62 and feeds cooling air F5 into the rib passage 68 of the second rib 64. The second rib 64 is thus a primary dependent rib that receives cooling air from the first rib 64. The second rib 64 provides cooling air F6 into the adjacent cooling channel 72, which discharges cooling air F9 through the side 62c of the airfoil wall 62. The third rib 64 is also a feed rib and provides cooling air F7 into the same cooling channel 72 that receives cooling air F6, which is also discharged as cooling air F9. The third rib 64 also feeds cooling air F8 into the next adjacent cooling channel 72, which feeds cooling air F10 into the rib passage 68 of the last rib 64. The last rib 64 is thus a primary dependent rib. The last rib 64 feeds cooling air F11 into the adjacent cooling channel 72. The cooling channel 72 discharges cooling air F12 through the side 62c of the airfoil wall 62 and feeds cooling air F13 through holes or slots 80, which discharges cooling air F14 from the trailing end 62b.

Figure 6:
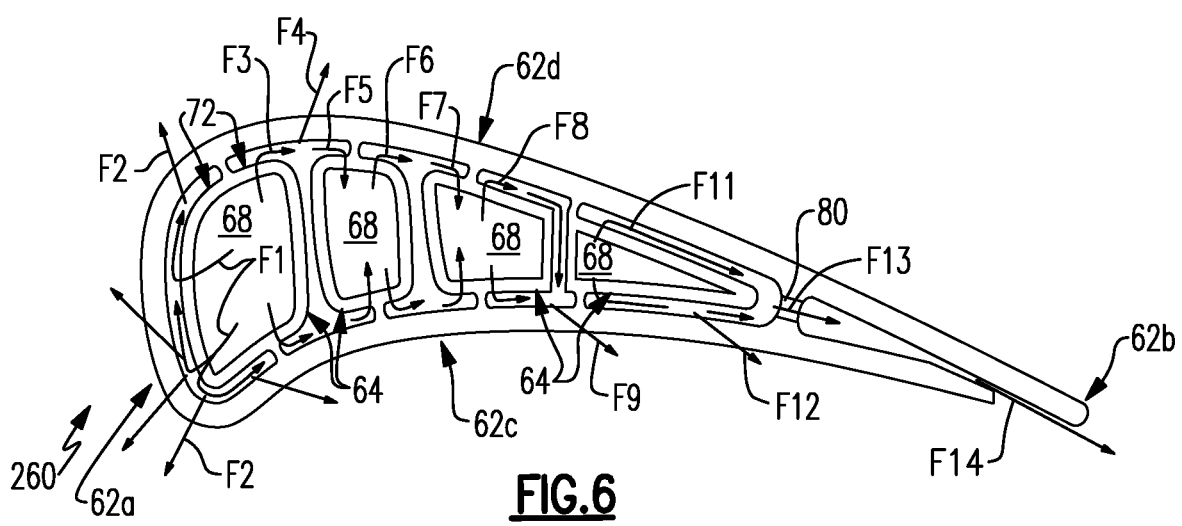
FIG. 6 illustrates an airfoil with a modified dual axial flow cooling circuit.

Referring to FIG. 6, the airfoil 260 is configured with a modified dual axial flow cooling circuit in which the flow of the cooling air is indicated by flow arrows. In this example, the first rib 64 is again a feed rib. The feed rib provides cooling air F1 to the forward cooling channel 72 adjacent the leading end 62a. The cooling channel 72 discharges cooling air F2 at the leading end 62a and forward portions of the sides 62c/62d. The feed rib also provides cooling air F3 to the next adjacent cooling channel 72. The cooling channel 72 discharges cooling air F4 through the side 62d of the airfoil wall 62 and feeds cooling air F5 into the rib passage 68 of the second rib 64. The second rib 64 is thus a primary dependent rib that receives cooling air from the first rib 64. The second rib 64 provides cooling air F6 into the adjacent cooling channel 72, which feeds cooling air F7 into the rib passage 68 of the third rib 64. The third rib 64 is thus a secondary dependent rib. The third rib 64 provides cooling air F8 into the next adjacent cooling channel 72, which discharges cooling air F9 through the side 62c of the airfoil wall 62. The last rib 64 is a fed rib and feeds cooling air F11 into the next adjacent cooling channel 72, which discharges cooling air F12 through the side 62c of the airfoil wall 62 and feeds cooling air F13 through holes or slots 80, which discharges cooling air F14 from the trailing end 62b.

Figure 7:
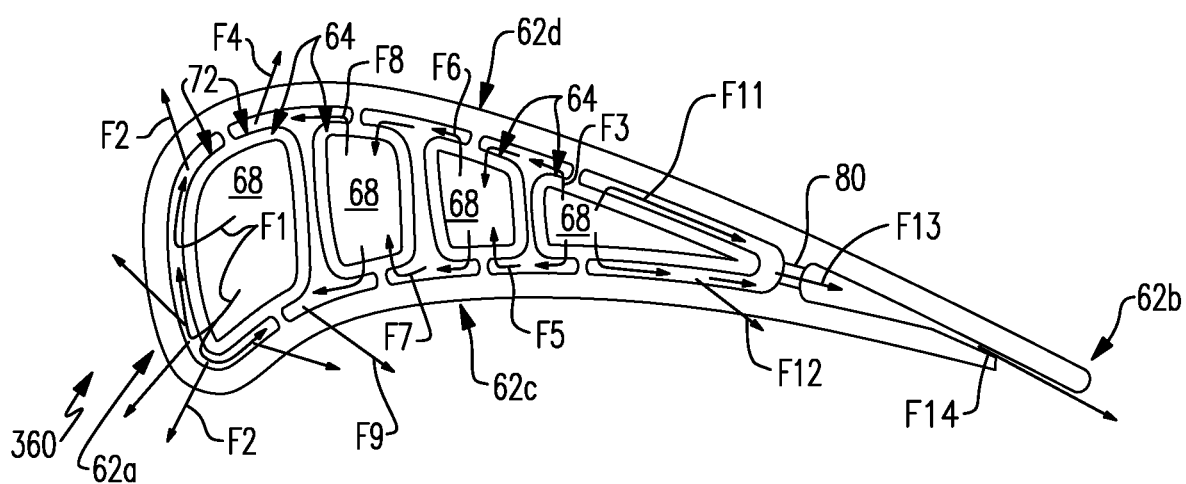
FIG. 7 illustrates an airfoil with an axial aft-to-fore flow cooling circuit.

In the examples above, the cooling circuits shown and described are generally fore-to-aft axial flow configurations. It is to be appreciated that the relative locations of the feed ribs, primary dependent ribs, and secondary dependent ribs may be modified into an aft-to-fore flow configuration. FIG. 7 illustrates an example airfoil 360 that is configured with an aft-to-fore cooling circuit in which the flow of the cooling air is indicated by flow arrows. In this example, the first rib 64 is a feed rib. The feed rib provides cooling air F1 to the forward cooling channel 72 adjacent the leading end 62a. The cooling channel 72 discharges cooling air F2 at the leading end 62a and forward portions of the sides 62c/62d. In this example, the first rib 64 does not provide cooling air to the next adjacent cooling channel 72. Rather, the last rib 64 serves as a feed rib and provides cooling air F3 into the adjacent forward cooling channel 72. The cooling channel 72 feeds cooling air F5 into the rib passage 68 of the third rib 64, which is a primary dependent rib. The third rib 64 feeds cooling air F6 into the adjacent forward cooling channel 72, which feeds cooling air F7 into the rib passage 68 of the second rib 64, which is a secondary dependent rib. The second rib 64 feeds cooling air F8 into the adjacent forward cooling channel 72, which discharges cooling air F4 through the side 62d of the airfoil wall 62 and discharges cooling air F9 through side 62c of airfoil wall 62. The last rib 64 also feeds cooling air F11 into the aft adjacent cooling channel 72, which discharges cooling air F12 through the side 62c of the airfoil wall 62 and feeds cooling air F13 through holes or slots 80, which discharges cooling air F14 from the trailing end 62b.

Figure 8:
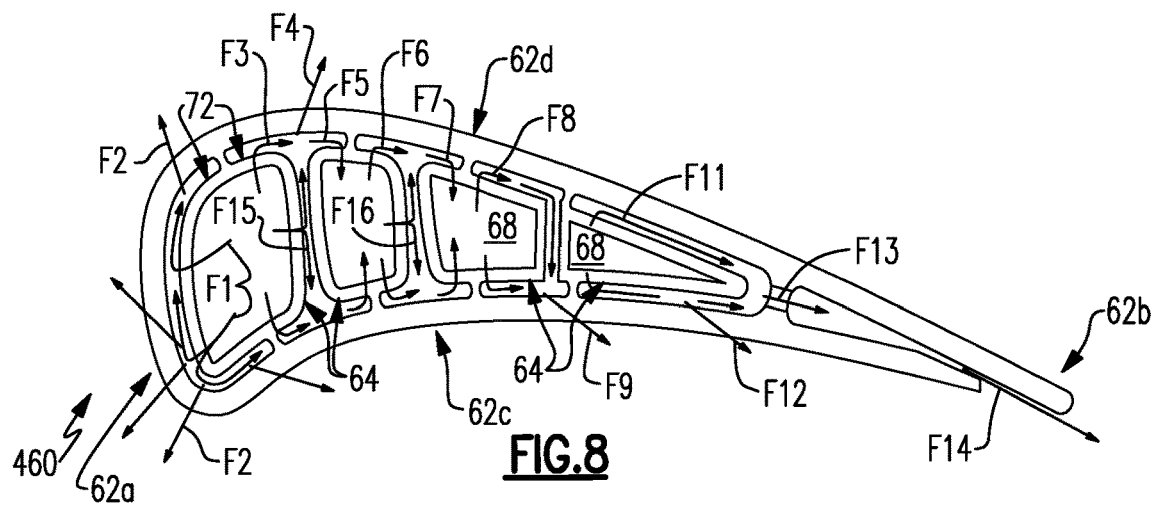
FIG. 8 illustrates an airfoil with a dual axial flow cooling circuit and re-supply flow.

In the examples above, the forward and aft walls 66a/66b of the tube portions 66 of the ribs 64 do not contain any apertures 74. In that regard, any cooling air fed from a rib 64 is fed from apertures 74 in the side walls 66c/66d directly to the side 62c or 62d of the airfoil wall 62. In such a configuration, cooling air may migrate through the middle portions of the "H" shape of the cooling channels 72 if there are pressure differentials. However, in further examples, apertures 74 may also be provided in one or more of the forward and aft walls 66a/66b of the tube portions 66 of the ribs 64, which may facilitate reducing cross-flow between the lobe portions of the cooling channels 72 and/or serve as a "re-supply" of cooling air to the lobe portions. As an example, FIG. 8 illustrates an airfoil 460 that is similar to the airfoil 260 described above except that the first and second ribs contain apertures 74 in the aft walls 66b of the tube portions 66. The first rib thus also feeds cooling air F15 into the aft adjacent cooling channel 72, which is then discharged as cooling air F4 and fed as cooling air F5 into the rib passage 68 of the second rib. The second rib also feeds cooling air F16 into the aft adjacent cooling channel 72, which is then fed as cooling air F7 into the rib passage 68 of the third rib. The additional cooling air flows F15 and F16 facilitate reducing cross-flow between the lobe portions of the cooling channels 72 and may also serve as a re-supply of cooling air to the lobe portions.

Figure 9:
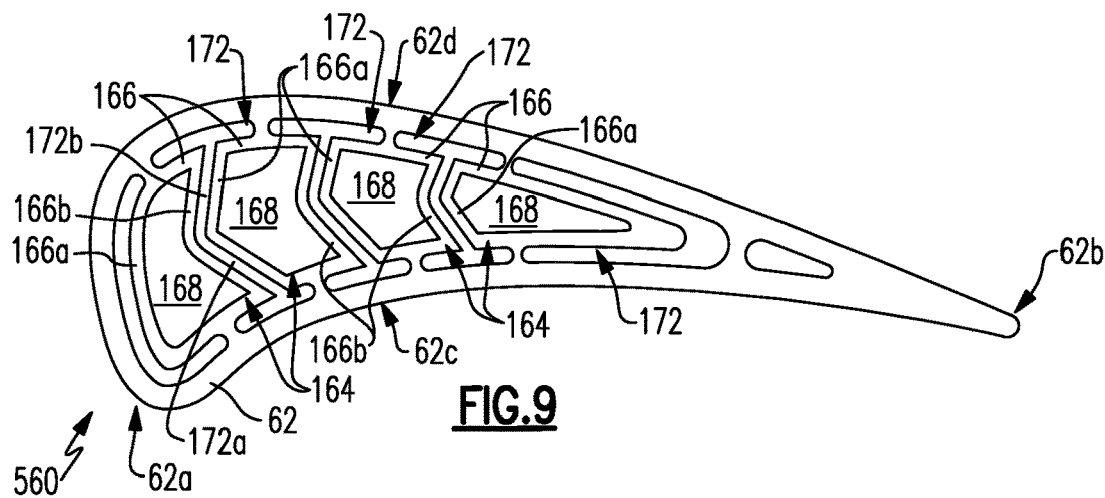
FIG. 9 illustrates an airfoil with ribs that have a chevron shape.

As indicted earlier in this disclosure, the tube portions 66 of the ribs 64 may have rectangular or other shapes. FIG. 9 illustrates another example airfoil 560 with ribs 164 that have tube portions 166 with a chevron shape that circumscribe rib passages 168. In this regard, at least one wall of the tube portions 166 is "V-shaped." As shown, the forward wall 166a, the aft wall 166b, or both may be "V-shaped." The chevron shapes of the ribs 164 are also complimentary in that the "V-shaped" wall of one rib 164 is nested with and follows the "V-shaped" wall of an adjacent rib 164. As a result, the middle portions of one or more of the cooling channels 172 define two retrograde segments 172a/172b that extend, respectively, from the two side lobe portions of the cooling channel 172. As will be described below, the retrograde segments 172a/172b facilitate reducing flow through the middle portions of the cooling channels 172.

Figure 10:
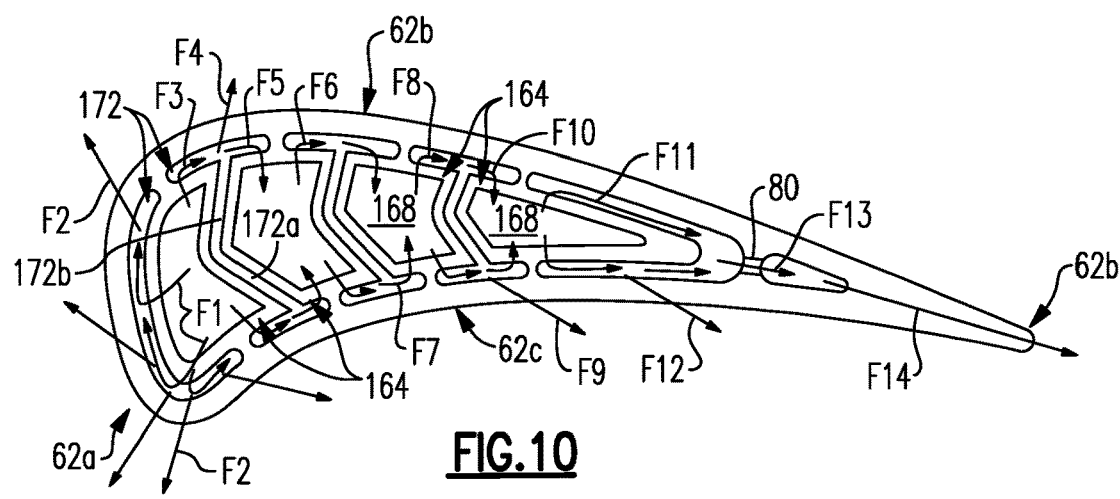
FIG. 10 illustrates the airfoil of FIG. 9 with a full axial flow cooling circuit.

Referring to FIG. 10, the airfoil 560 is configured with a full axial flow cooling circuit, similar to the airfoil 60 of FIG. 4, in which the flow of the cooling air is indicated by the same flow arrows. In this example, the retrograde segments 172a/172b limit cooling air flow between the lobes of the cooling channels 172. For instance, cooling air F3 from the rib passage of the first rib 164 flows axially aft in the lobes of the cooling channel 172. In order to enter the middle portion of the cooling channel 172 between the lobe portions, the cooling air F3 must turn back (i.e., turn more than 90°) from its axially aft flow direction and flow forward. The momentum of the axially aft flow, however, limits the cooling air from turning in the forward direction, thereby limiting the flow into the middle portion of the cooling channel 172. Limiting the flow into the middle portion facilitates maintaining the cooling air at the sides 62c/62d of the airfoil wall 62, where cooling is most needed.

Figure 11:
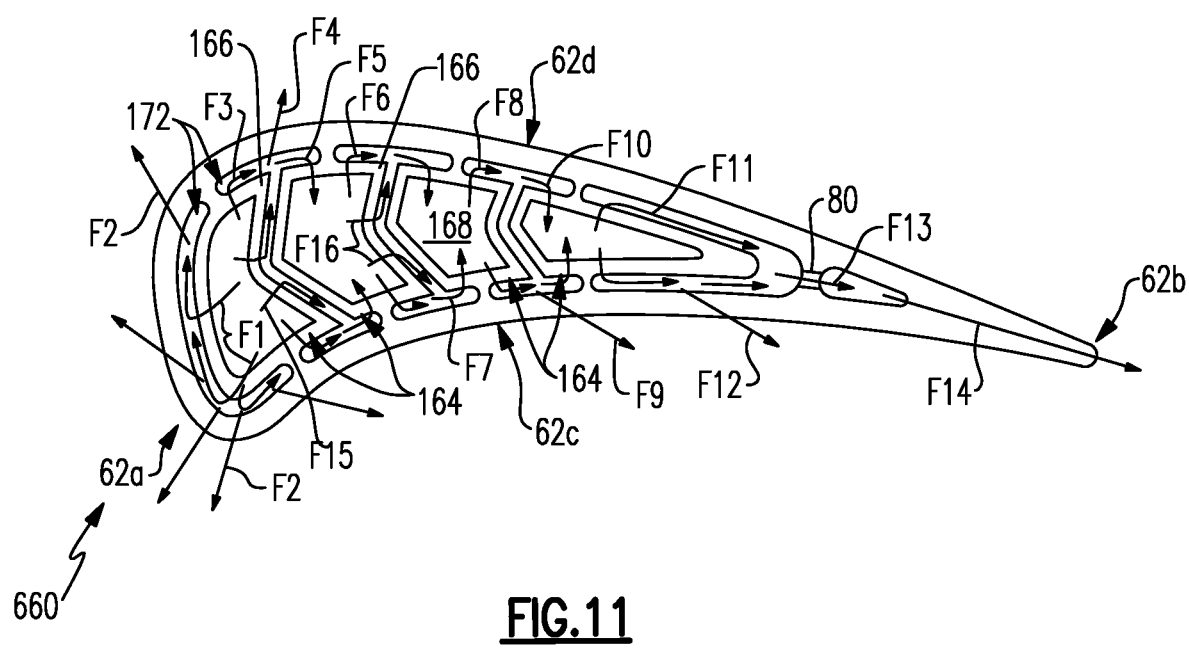
FIG. 11 illustrates an airfoil with ribs that have a chevron shape and a dual axial flow cooling circuit and re-supply flow.

FIG. 11 illustrates another example airfoil 660 that is similar to the airfoil 560 except that the first and second ribs 164 contain apertures 74 in the "V-shaped" walls of the tube portions 166. The first rib thus also feeds cooling air F15 into the aft adjacent cooling channel 172, which is then discharged as cooling air F4 and is fed as cooling air F5 into the rib passage 68 of the second rib. The second rib also feeds cooling air F16 into the aft adjacent cooling channel 172, which is then fed as cooling air F7 into the rib passage 68 of the third rib. The additional cooling air flows F15 and F16 facilitate reducing cross-flow between the lobe portions of the cooling channels 72 and may also serve as a re-supply of cooling air to the lobe portions.

The cooling schemes illustrated above allow a reduction in the cooling air required to cool the airfoil by utilizing the same air in multiple cooling channels. In addition, as the air travels through the cooling channels, it picks up heat. Dumping this air into the rib passages causes the ribs to be surrounded in relatively warmer air, reducing the thermal gradient and stress between the ribs and airfoil walls.

The airfoils described herein may be fabricated from superalloys using such processes as investment casting or additive manufacturing. For example, in an investment casting process, an investment core is fabricated and then used in the casting of the superalloy to define internal features in the airfoil. Such an investment core can be formed from a ceramic or other suitable material in a molding process in which the ceramic or other material is injected into the cavity of a molding die. To form the ribs described herein, a sacrificial body with the shape of the ribs is inserted into the cavity and the ceramic or other material is molded around the sacrificial body. The sacrificial body may be formed of a thermoplastic or other material that can readily later be removed without damaging the core. The sacrificial body is then removed, such as by melting, leaving open the pattern of the ribs in the investment core. Subsequently, when the core is used in the investment casting, the superalloy fills the open pattern of the ribs left by the sacrificial body in the core, thereby forming the walls of the ribs.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil wall defining a leading end, a trailing end, and first and second sides joining the leading end and the trailing end;
   first and second ribs each connecting the first and second sides of the airfoil wall, each of the first and second ribs defining
      a tube portion circumscribing a rib passage and including cooling apertures, and
      first and second connector arms solely joining the tube portion to, respectively, the first and second sides of the airfoil wall,
   the airfoil wall and the first and second ribs bounding a cooling channel there between, the cooling apertures of the first and second ribs opening at the cooling channel such that there is a cooling circuit in which the rib passage of the first rib is fluidly connected to the rib passage of the second rib through the cooling apertures of the first rib, then from the cooling apertures of the first rib to the cooling channel, and then from the cooling channel to the cooling apertures of the second rib.

2. The airfoil as recited in claim 1, wherein the tube portion includes forward and aft walls and first and second side walls joining the forward and aft walls, the first connector arm projects from the first side wall and the second connector arm projects from the second side wall, and one or more of the cooling apertures are located in the first and second side walls.

3. The airfoil as recited in claim 2, wherein one or more of the cooling apertures are located in the forward and aft walls.

4. The airfoil as recited in claim 1, wherein the airfoil wall includes a plurality of cooling holes, at least a portion of the cooling holes opening at the cooling channel.

5. The airfoil as recited in claim 1, wherein the trailing end of the airfoil wall includes cooling holes that are in the cooling circuit downstream of the first and second ribs.

6. The airfoil as recited in claim 1, wherein the tube portion has a chevron shape.

7. The airfoil as recited in claim 1, wherein the cooling channel has two side lobe portions which extend along, respectively, the first and second sides of the airfoil wall, and a middle portion that connects the two side lobe portions.

8. The airfoil as recited in claim 7, wherein the middle portion includes two retrograde segments that extend, respectively, from the two side lobe portions.

9. The airfoil as recited in claim 1, wherein the cooling channel has an I-shaped cross-section.

10. An airfoil comprising:
    an airfoil wall defining a leading end, a trailing end, and first and second sides joining the leading end and the trailing end;
    a feed rib and a dependent rib each connecting the first and second sides of the airfoil wall, the feed rib and the dependent rib each defining
       a tube portion circumscribing a rib passage and including cooling apertures, and
       first and second connector arms solely joining the tube portion to, respectively, the first and second sides of the airfoil wall,
    the airfoil wall, the feed rib, and the dependent rib bounding a cooling channel there between, wherein the rib passage of the feed rib is configured to receive source cooling air and feed the source cooling air via the cooling apertures and the cooling channel to the rib passage of the dependent rib.

11. The airfoil as recited in claim 10, wherein the rib passage of the dependent rib is fully dependent on the feed rib to receive cooling air.

12. The airfoil as recited in claim 10, wherein the rib passage of the dependent rib is partially dependent on the feed rib to receive cooling air.

13. The airfoil as recited in claim 10, wherein the feed rib is forward of the dependent rib.

14. The airfoil as recited in claim 10, wherein the feed rib is aft of the dependent rib.

15. The airfoil as recited in claim 10, wherein the cooling channel has two side lobe portions which extend along, respectively, the first and second sides of the airfoil wall, a middle portion that connects the two side lobe portions, and the middle portion includes two retrograde segments that extend, respectively, from the two side lobe portions.

16. The airfoil as recited in claim 10, wherein the cooling apertures include impingement cooling apertures in the feed rib and the dependent rib which are configured to provide impingement cooling on the airfoil wall and inflow cooling apertures in the dependent rib which are configured to reduce pressure loss of the cooling air entering the rib passage of the dependent rib.

17. An airfoil comprising:
    an airfoil wall defining a leading end, a trailing end, and first and second sides joining the leading end and the trailing end;
    a feed rib, a primary dependent rib, and a secondary dependent rib each connecting the first and second sides of the airfoil wall, the feed rib, the primary dependent rib, and the secondary dependent rib each defining
       a tube portion circumscribing a rib passage and including cooling apertures, and
       first and second connector arms solely joining the tube portion to, respectively, the first and second sides of the airfoil wall,
    the airfoil wall, the feed rib and the primary dependent rib bounding a first cooling channel there between and the airfoil wall, the primary dependent rib, and the secondary dependent rib bounding a second cooling channel there between, wherein the rib passage of the feed rib is configured to receive source cooling air and feed the source cooling air via the cooling apertures and the first cooling channel to the rib passage of the primary dependent rib and the primary dependent rib is configured to feed the cooling air via the cooling apertures and the second cooling channel to the rib passage of the secondary dependent rib.

18. The airfoil as recited in claim 17, wherein the rib passage of the primary dependent rib is fully dependent on the feed rib to receive cooling air, and the rib passage of the secondary dependent rib is fully dependent on the primary dependent rib to receive cooling air.

19. The airfoil as recited in claim 17, wherein the feed rib is forward of the primary dependent rib and the secondary dependent rib.

20. The airfoil as recited in claim 17, wherein the feed rib is aft of the primary dependent rib and the secondary dependent rib.

21. The airfoil as recited in claim 17, wherein the first cooling channel and the second cooling channel each have two side lobe portions which extend along, respectively, the first and second sides of the airfoil wall, a middle portion that connects the two side lobe portions, and the middle portion includes two retrograde segments that extend, respectively, from the two side lobe portions.

* * * * *